United States Patent [19]
Roberti

[11] Patent Number: 6,073,131
[45] Date of Patent: Jun. 6, 2000

[54] METHOD AND SYSTEM FOR SORTING A PLURALITY OF GROUPS OF RECORDS IN A DATA PROCESSING SYSTEM

[75] Inventor: Paolo Francesco Roberti, Charleston, S.C.

[73] Assignee: International Business Machines Corporation, Armonk, N.Y.

[21] Appl. No.: 08/963,691

[22] Filed: Nov. 4, 1997

[51] Int. Cl.[7] .................................................. G06F 17/30
[52] U.S. Cl. ............................................................ 707/7
[58] Field of Search ...................................... 707/7

[56] References Cited

U.S. PATENT DOCUMENTS

| | | | |
|---|---|---|---|
| 5,084,815 | 1/1992 | Mazzario | 395/800 |
| 5,794,240 | 8/1998 | Yamashita | 707/7 |
| 5,924,093 | 7/1999 | Potter et al. | 707/7 |

*Primary Examiner*—Thomas G. Black
*Assistant Examiner*—William Trinh
*Attorney, Agent, or Firm*—Sawyer Law Group LLP; David J. Kappos

[57] ABSTRACT

The present invention provides a method and system for sorting a plurality of groups of records in a data processing system. The method and system comprises providing a main address space and a plurality of sort address spaces. Each of the plurality of sort address spaces includes one sort thread for receiving records within one group to be sorted. The main address space includes a plurality of load threads. Each of the load threads receives records from a corresponding sort thread. The main thread controls the plurality of sort threads and the plurality of load threads. The method and system further utilizes the main thread, the plurality of sort threads and the plurality of load threads for sorting the plurality of groups of records in parallel. The method and system in accordance with the present invention has the following advantages. First, the elapsed time for sorting is dramatically reduced. The CPU time is also reduced when utilizing the system and method in accordance with the present invention. In addition, a system and method in accordance with the present invention dynamically starts as many sort address spaces as there are groups of records to be sorted. Each sort address space will sort records from only one group. The method and system allows for each sorted record to be loaded into the file corresponding to the particular group. The records can be passed to the appropriate indices by the load threads within the main address space running in parallel. The method and system allows for each record to be sorted to be passed to the correct location. The records can be passed to the appropriate files by the load threads within the main address space running in parallel.

25 Claims, 2 Drawing Sheets

Starting a Plurality of Software Threads to Sort the Plurality of Groups of Records — 22

Sorting the Plurality of Groups of Records in Parallel Utilizing the Software Threads — 24

METHOD AND SYSTEM FOR SORTING A PLURALITY OF GROUPS OF RECORDS IN A DATA PROCESSING SYSTEM

FIELD OF THE INVENTION

The present invention relates generally to sorting records in a data processing system, more particularly the present invention relates to a method and system for sorting a plurality of groups of records where the groups have different record lengths, offset and/or length of the sort field within each group of records.

BACKGROUND OF THE INVENTION

Sorting mechanisms are utilized extensively in data processing systems for sorting records, such as, for example, ZIP codes, addresses, company name, last name of an individual, etc. Oftentimes the mechanisms are utilized to sort different groups of records at the same time. Sometimes the different groups of records each have their own record length, field offset and field length. There is a need to sort a plurality of groups of records when building multiple indices for the same table or database. As the number of records within a group get larger, the overall elapsed time to sort records within a group becomes longer. In addition, as the number of groups increases, and if those additional record lengths and/or sort field lengths of the records in the new groups are different than the record lengths and/or sort field lengths of the then existing groups, the elapsed time and the CPU time to sort is also increased. To further explain this problem in context of a data processing system refer to the following.

A typical data processing environment in which sorting will take place is, for example, in International Business Machine, Inc.'s MVS/ESA operating system mainframe environment utilizing multiple central processing units. A conventional process for sorting groups of records in such a data processing environment is a sequential process as will be described hereinbelow.

The normal solution is to add a common sort field to all the records, and sort all the records in one swipe. The added sort field is as long as the longest sort field padded with binary zeroes when needed.

Sorting groups of records in one swipe has the following disadvantages. First, since the sorting is accomplished in a sequential manner, as the number of groups to be sorted increases the elapsed time and the CPU time to sort these groups becomes greater. Accordingly, as the number of groups of records increases, the time to sort those groups of records also increases in a linear fashion. In addition, as the number of groups with different record lengths and/or sort field lengths increases, the total amount of data that has to be sorted is increased due to the padding or concatenation of additional data onto all records to be sorted. This also increases the elapsed time and the CPU time for sorting the groups of records.

Accordingly, what is needed is a system and method which decreases the elapsed time required to sort groups of records in a data processing system. The system and method should be easy to implement, cost effective and easily adaptable to existing data processing systems. The present invention addresses such a need.

SUMMARY OF THE INVENTION

The present invention provides a method and system for sorting a plurality of groups of records in a data processing system. The method and system comprises providing a main address space and a plurality of sort address spaces. Each of the plurality of sort address spaces includes one sort thread for receiving records within one group to be sorted. The main address space includes a plurality of load threads. Each of the load threads receives sorted records from a corresponding sort thread. The main thread controls the plurality of sort threads and the plurality of load threads. The method and system further utilizes the main thread, the plurality of sort threads and the plurality of load threads for sorting the plurality of groups of records in parallel.

The method and system in accordance with the present invention has the following advantages. First, the elapsed time for sorting is dramatically reduced. The CPU time is also reduced when utilizing the system and method in accordance with the present invention. In addition, a system and method in accordance with the present invention dynamically starts as many sort address spaces as there are groups of records to be sorted. Each sort address space will sort records from only one group. The method and system allows for each sorted record to be loaded into the file corresponding to the particular group. The records can be passed to the appropriate files by the load threads within the main address space running in parallel.

DESCRIPTION OF THE INVENTION

The present invention is directed to a system and method for sorting a plurality of groups of records in a data processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figures 1, 2:
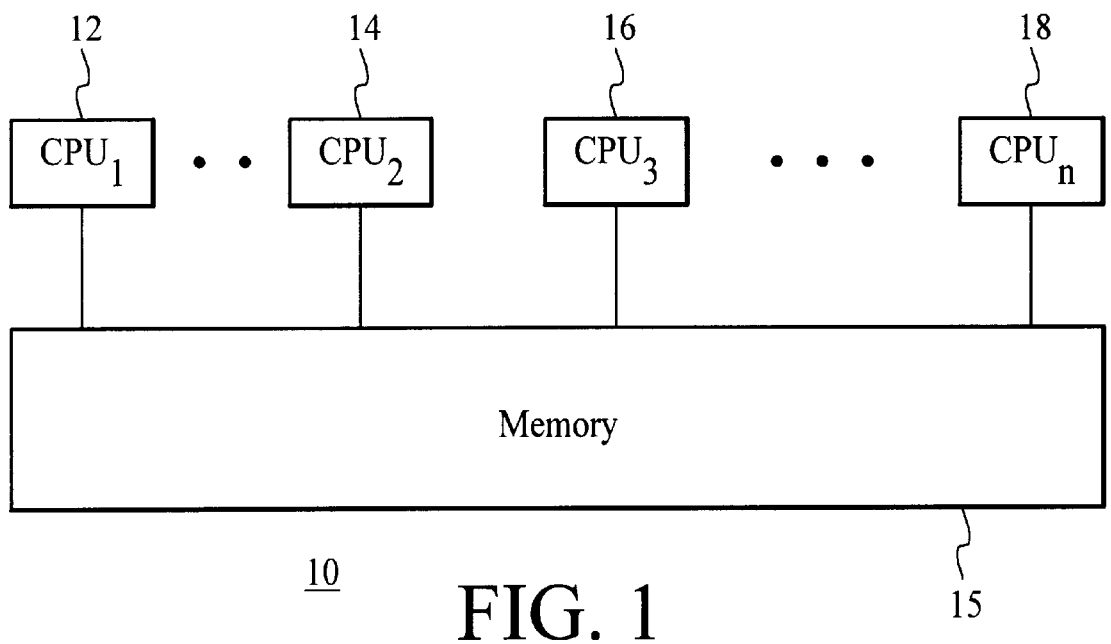
FIG. 1 is a block diagram of a data processing system.
FIG. 2 is a simple flow chart illustrating a sorting process in accordance with the present invention which can be utilized in the data processing system of FIG. 1.

FIG. 1 is a block diagram of a data processing system 10. The data processing system 10 comprises a plurality of multitasking devices such as CPU 1 ... $CPU_n$ 12, 14, 16 and 18, respectively, such as IBM system/390 running under the IBM MVS/ESA operating system. These CPUs 12–16 operate together in concert with a memory 15 to execute a variety of tasks. It is envisioned that attached to the data processing system 10 will be a variety of I/O devices such as a mouse pointing device, a keyboard, a printer, etc. The present invention is generally implemented by one or more computer programs under control of the operating system which cause the data processing system to perform the desired function as described herein. Alternatively, the present invention may be implemented in the operating system itself.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

One of the tasks that the data processing system 10 undertakes is sorting a plurality of groups of records. As above mentioned, sorting routines are utilized extensively in data processing systems for different records, such as, for example, ZIP codes, addresses, company name, last name of an individual, etc. Oftentimes, the routines are utilized to sort different groups of records. Oftentimes the different groups of records each have their own record length, sort field offset and sort field length within the record. As has also been before mentioned, as the number of groups of records increase, the overall elapsed time and CPU time to sort records within a group becomes longer. In addition, as the number of groups increase, and if those additional record lengths and/or sort field lengths of the records in the new groups are different than the record lengths and/or sort field lengths of the then existing groups, the elapsed time and the CPU time to sort is also increased.

In an MVS/ESA operating system environment, a conventional sort operation for a plurality of groups of records is shown below.

1. Assign an identifier from 0 to 255 to each record type to be sorted

2. Select the length of the longest key used to sort and add 1; this is the actual sort key length.

3. Start the sort routine (MVS SORT) specifying the following SORT parameters:

(a) Sort key offset of 0.

(b) Sort key length equal to the actual sort key length.

(c) Variable length record type.

4. Read one record at a time; if end of input is encountered GO TO STEP 10.

5. Identify the type of record and the offset and length within the record.

6. Extract the sort key from the record and extend it with binary zero characters to the actual sort key length minus 1.

7. Form a new record by concatenating the following:

(a) one byte containing the record identifier in binary form computed in Step 5

(b) the extended sort key created in step 6

(c) the record read in step 4.

8. Pass the record created in step 5 to MVS sort.

9. GOTO Step 4.

10. Read a record from MVS SORT; if no more records GOTO STEP 15.

11. Identify the record by examining the first byte which contains the record identifier in binary form (see STEP 7).

12. Reconstruct the original record by keeping only the bytes whose offset in the record is greater or equal to the actual sort key length.

13. Write the reconstructed record to the appropriate file associated with the record identifier.

14. GOTO STEP 10.

15. Terminate.

If a fixed record type is used to sort (see STEP 3), STEP 7 and STEP 12 must be modified accordingly. In STEP 7, the record being formed must be padded with binary zero bytes to the length used. In STEP 12, the bytes used to pad the record must be removed to reconstruct the original record.

The above described conventional sorting mechanism adds a common sort field to all the records, and sorts all the records in one pass. The added sort field is as long as the longest sort field plus 1 and is padded with binary zeros when needed. As has been above mentioned, this solution increases linearly with an increase in the number of groups of records and also increases as new groups with different record lengths and/or sort field lengths are added.

A method and system of sorting a plurality of groups of records in accordance with the present invention provides a set of software threads which can be used to sort groups of records of varying record lengths, sort field offset and sort field lengths in a parallel fashion. What is meant by thread in the context of the present application is a dispatchable unit of work that is recognized by the operating system. In so doing, the elapsed time and the CPU time required for sorting the plurality of group records is substantially reduced. The set of software threads addresses the problem faced when the need arises to sort several groups of records, each group with a different record length and a different sort field offset and length. In addition, with the use of the method and system in accordance with the present invention, there is no restriction on the initial order of the records of all groups being sorted.

To now clearly understand the features of the present invention, refer now to the following discussion in conjunction with the accompanying figures. FIG. 2 is a simple flow chart of the operation of a process for sorting a plurality of groups of records in accordance with the present invention. First, a plurality of software threads are started for the plurality of groups of records to be sorted, via step 22. Next, each of the groups of records are sorted in parallel utilizing the plurality of software threads, via step 24. In so doing the elapsed time for sorting can be substantially reduced.

Figure 3:
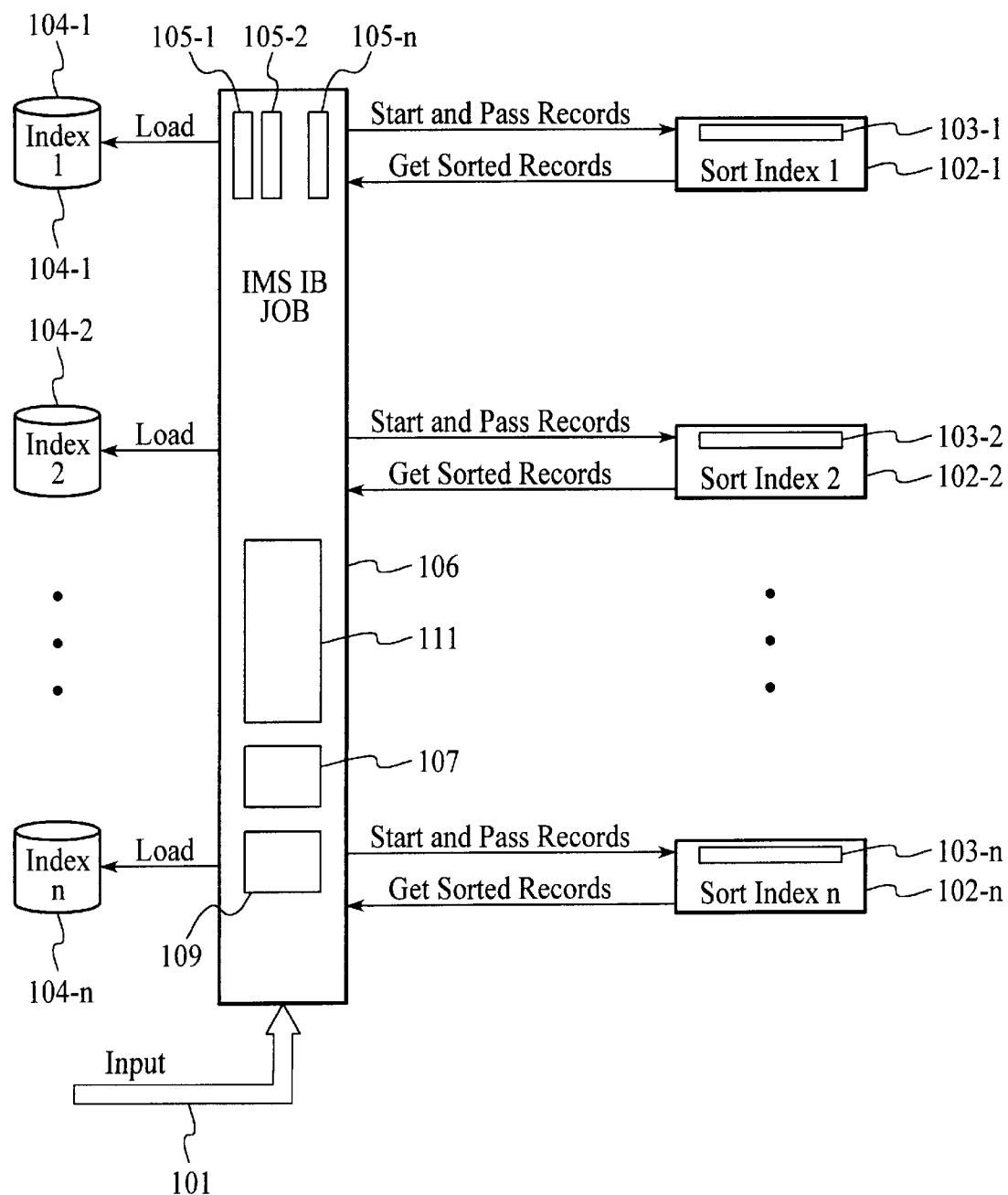
FIG. 3 is a block diagram illustrating a sorting process in accordance with the present invention which can be utilized in the data processing system of FIG. 1.

The method and system in accordance with the present invention is preferably a software program which has a plurality of threads which interact with each other in contrast to the single threaded approach utilized in sorting a plurality of groups of records in data processing systems. This software program can be implemented on a floppy disk, hard disk or other computer readable medium. Referring now to FIG. 3, what is shown is a block diagram of a system 100 utilized to sort a plurality of record groups in a parallel fashion. The system 100 includes a plurality of sort address spaces 102-1 to 102-n, a plurality of files 104-1 to 104-n in which the groups of records are loaded, and a main address space 106. In a preferred embodiment, a single group of records is loaded in a single file in sorted order. The main address space 106 receives the plurality of groups of records to be sorted at input 101.

Within each sort address space 102-1 to 102-n is one sort thread 103-1 to 103-n, respectively. Each of the sort threads 103-1 to 103-n would be implemented by a common sort routine. The main address space 106 includes a plurality of load threads 105-1 to 105-n which correspond to the sort threads 103-1 to 103-n. Each of the load threads 105-1 through 105-n are implemented by a common load routine. The main address space 106 includes a recovery thread 107 and a termination thread 109. The recovery thread 107 and termination thread 109 are implemented by recovery and termination routines, respectively. The recovery and termination threads 107 and 109 are used to control the sorting system when unusual conditions occur in an operating system environment.

The main address space 106 also includes a main thread 111 which controls the sort threads 103-1 to 103-n and load threads 105-1 to 105-n. The main thread 111 is implemented by a main routine.

Accordingly, the method and system in accordance with the present invention allows for dynamically starting as many sort address spaces 102-1 through 102-n as there are groups of records to be sorted. Each of the sort threads 103-1 to 103-n within each sort address spaces 102-1 to 102-n sort records from only one group. In a preferred embodiment, the method and system utilizes a cross memory to pass each record to be sorted to the correct sort address space 102-1 to 102-n. The records can be passed to the sort address spaces 102-1 to 102-n by the main thread 111 within the main address space 106. Thereafter, the sorted records are read back from the appropriate sort address spaces 102-1 to 102-n. The sorted records can be loaded into the files 104-1 to 104-n, by load threads 105-1 to 105-n that are within the main address space 106. The sort address spaces 102-1 to 102-n are terminated after the sort routines read back the MVS sort diagnostic output and pass it to the main thread 111. The main thread 111 then writes the ouput out as one file to be viewed by the user of the sort mechanism.

As before mentioned, the system and method can also be utilized to automatically detect abnormal termination of any sort address space via the recovery thread 107 and the termination thread 109. All sort address spaces can be abnormally terminated should the main thread terminate abnormally.

The method and system in accordance with the present invention dramatically decreases the elapsed time and the CPU time it takes to sort several groups of records, by taking advantage of availability of multiple central processing units (CPUs) on data processing systems running a mainframe operating system, such as the MVS/ESA operating system.

As has been mentioned, each of these threads are implemented in a preferred embodiment by software routines. The following discussion describes routines that could be utilized if a system and method in accordance with the present invention is implemented on an IBM system 390 running under the IBM MVS/ESA operating system. One of ordinary skill in the art readily recognizes that the present invention is not limited to such a system, that there are many systems in which the present invention has application and that their use would be within the spirit and scope of the present invention.

SORT-ROUTINE

There are as many SORT-ROUTINEs executing as there are record types. Each SORT-ROUTINE executes in its address space. It receives records of one type only to be sorted and, after sorting them, it passes them back to the LOAD-ROUTINE.

The SORT-ROUTINE works as follows:

1. Invoke MVS services_use, for example, IARSERV_ macro to pass the parameters_to gain access to a buffer to be shared with the MAIN-ROUTINE address space.

2. Start MVS SORT specifying sort parameters passed by the MAIN-ROUTINE as a parameter.

3. Receive one record at a time from the MAIN-LINE ROUTINE; if no more records are available GOTO STEP 6.

4. Pass the record received in STEP 3 to MVS SORT.

5. GOTO STEP 3.

6. Get from MVS SORT one sorted record at a time; if no more sorted records are available GOTO STEP 9.

7. Pass the sorted record obtained in STEP 6 back to the LOAD-ROUTINE. Use a CROSS-MEMORY post to signal to the LOAD-ROUTINE that new sorted records are available in the shared buffer.

8. GOTO STEP 6.

9. Signal the LOAD-ROUTINE using a CROSS-MEMORY post that there are no more sorted records and terminate.

LOAD-ROUTINE

There are as many LOAD-ROUTINEs executing as there are record types. Each LOAD-ROUTINE receives sorted records from the SORT-ROUTINE which sorts records of the same type, and writes them (i.e. LOAD them) into the file where sorted records must be stored.

The LOAD-ROUTINE works as follows:

1. Wait for the SORT-ROUTINE to signal that the first sorted record is available.

2. Receive one sorted record at a time from the SORT-ROUTINE via the same shared buffer used by the MAIN-ROUTINE to pass records to the SORT-ROUTINE. If no more records are available GOTO STEP 5.

3. Write the sorted record to an output file designated for this type of record.

4. GOTO STEP 2.

5. Terminate.

MAIN-ROUTINE

There is only one MAIN routine which coordinates all other threads. It works as follows:

1. Mark the address space non-swappable to allow the creation of one or more CROSS-MEMORY environments.

2. Create a recovery environment by using, for example, the ESTAE macro (see RECOVERY EXIT).

3. For each type of record to be sorted, use, for example, the ASCRE macro to start a SORT address space (see SORT ROUTINE). When invoking the ASCRE macro, provide an EXIT to be executed by MVS when the address space being created terminates (see TERMINATION EXIT). The following parameters are passed to each SORT ROUTINE:

(a) the address of a buffer to be shared between the MAIN-ROUTINE and the SORT ROUTINE.

(b) the SORT parameters to be passed to MVS SORT to sort the appropriate type of records.

4. Read one record to be sorted at a time; if no more records are available GOTO STEP 7.

5. Check the type of record read in STEP 4; pass the record to the SORT ROUTINE which sorts that type of record. The record is passed via a shared buffer between the MAIN-ROUTINE and the SORT ROUTINE. Use the CROSS-MEMORY post to signal the SORT-ROUTINE that new records are available in the shared buffer.

6. GOTO STEP 4.

7. Signal all SORT ROUTINEs that there are no more records to be sorted via CROSS-MEMORY POSTs.

8. Start as many tasks to execute the LOAD-ROUTINE as there are record types. These tasks execute in the same address space as the MAIN-LINE routine.

9. Wait for all LOAD-ROUTINE tasks to terminate, and terminate.

The RECOVERY EXIT ROUTINE and the TERMINATION EXIT ROUTINE are executed only if an unusual condition has occurred during sorting.

RECOVERY EXIT ROUTINE

The RECOVERY EXIT ROUTINE is entered by MVS when an ABEND (i.e. error) is detected by MVS. It operates as follows:

1. Request a system dump using, for example, the SDUMP macro.

2. Terminate each sort address space still executing with a particular ABEND code.

3. Return control to MVS.

TERMINATION EXIT ROUTINE

The TERMINATION EXIT ROUTINE is entered by MVS when a sort address space is terminated. It works as follows:

1. Check if the sort address termination should be expected; if so, return control to MVS.

2. Issue an error message to warn the CONSOLE operator that a sort address space terminated prematurely.

3. Issue a particular ABEND code that will force the RECOVERY EXIT to be executed.

The method and system of sorting a plurality of groups of records in accordance with the present invention provides a set of threads which to allow for sorting groups of records in a parallel fashion. In so doing, the elapsed time required for sorting a plurality of group records is substantially reduced. The CPU time is also reduced when sorting a plurality of groups of records.

Accordingly, a system and method sorting a plurality of groups of records in accordance with the present invention has the following advantages:

1. It decreases the elapsed time to sort multiple types of record by sorting and writing to file each type separately and in parallel. Therefore, it takes full advantage of multiple CPU architectures.

2. Records to be sorted are not padded or concatenated with additional data. The total amount of data sorted in bytes is kept to absolute minimum for a faster sort.

3. The software utilized in the present invention is self contained. The operator or system programmer does not have to worry about starting and terminating the sort address spaces, since the sort address spaces are fully managed by the software.

Although the present invention has been described in accordance with the embodiments shown, one of ordinary skill in the art will readily recognize that there could be variations to the embodiments and those variations would be within the spirit and scope of the present invention. For example, although the present invention has been discussed in terms of the MVS/ESA operating system environment, one of ordinary skill readily recognizes that the system and method in accordance with the present invention should be utilized in a variety of environments and its use would be within the spirit and purpose of the present invention. For example, in an operating system such as UNIX, each thread would be required to have its own address space. Conversely, in the OS/2 operating system, it is conceivable to have all threads in one address space under the condition that several sort threads could coexist within one address space. Accordingly, many modifications may be made by one of ordinary skill in the art without departing from the spirit and scope of the appended claims.

What is claimed is:

1. A method for sorting a plurality of groups of records in a data processing system comprising the steps of:

(a) providing a main address space and a plurality of sort address spaces; each of the plurality of sort address spaces including a sort thread for receiving records within one group to be sorted; and the main address space including a plurality of load threads and a main thread, each of the load threads for receiving records from a corresponding sort thread, the main thread for controlling the plurality of sort threads and the plurality of load threads; and (b) utilizing the main thread, the plurality of sort threads and the plurality of load threads for sorting the plurality of groups of records in parallel.

2. The method of claim 1 in which the main thread starts and passes records to the plurality of sort threads and starts the plurality of load threads and waits for the sort threads and plurality of load threads to terminate.

3. The method of claim 2 in which each of the sort threads receive records from main thread and passes the sorted records to their corresponding load thread.

4. The method of claim 1 in which at least one of the plurality of groups of records has different record length than the others of the plurality of groups of records.

5. The method of claim 4 in which the main address space includes a recovery exit thread which executes when an error occurs in any of one of the main threads, the plurality of sort threads and the plurality of load threads.

6. The method of claim 5 in which the main address space includes a termination exit thread which executes when any of the plurality of sort threads terminated.

7. The method of claim 6 in which the termination exit thread will trigger the recovery exit thread if any sort address threads terminate prematurely.

8. The method of claim 7 wherein the plurality of sort threads are implemented by a sort routine.

9. The method of claim 8 wherein the plurality of load threads are implemented by a load routine.

10. The method of claim 9 wherein the main thread is implemented by a main routine.

11. The method of claim 10 wherein the recovery thread is implemented by a recovery routine.

12. The method of claim 11 wherein the termination thread is implemented by a termination routine.

13. A computer readable medium containing program instructions for sorting a plurality of groups of records in a data processing system, the data processing system including a main address space and a main thread inside of the main address space, the program instructions for:

(a) providing a plurality of sort address spaces; each of the plurality of sort address spaces including a sort thread for receiving records within one group to be sorted;

(b) providing a plurality of load threads within the main address space, each of the load threads for receiving records from a corresponding sort thread, the main thread for controlling the plurality of sort threads and the plurality of load threads; and (c) utilizing the main thread, the plurality of sort threads and the plurality of load threads for sorting the plurality of groups of records in parallel.

14. The computer readable medium of claim 13 in which the main thread starts and passes records to the plurality of sort threads and starts the plurality of load threads and waits for the sort threads and plurality of load threads to terminate.

15. The computer readable medium of claim 14 in which each of the sort threads receive records from main thread and passes the sorted records to their corresponding load thread.

16. The computer readable medium of claim 15 in which at least one of the plurality of groups of records has different record length than the others of the plurality of groups of records.

17. The computer readable medium of claim 16 in which the main address space includes a recovery exit thread which executes when an error occurs in any of one of the main threads, the plurality of sort threads and the plurality of load threads.

18. The computer readable medium of claim 17 in which the main address space includes a termination exit thread which executes when at least one of the plurality of sort threads terminated.

19. The computer readable medium of claim 18 wherein the plurality of sort threads are implemented by a sort routine.

20. The computer readable medium of claim 19 wherein the plurality of load threads are implemented by a load routine.

21. The computer readable medium of claim 20 wherein the main thread is implemented by a main routine.

22. The computer readable medium of claim 21 wherein the recovery thread is implemented by a recovery routine.

23. The computer readable medium of claim 22 wherein the termination thread is implemented by a termination routine.

24. A method for sorting a plurality of groups of records in a multiprocessor processing system, the data processing system running under an MVS/ESA operating system, the records from at least one of the plurality of groups of records having a different sort length than the other of the plurality of groups of records, the method comprising the steps of:

(a) providing a main address space and a plurality of sort address spaces; each of the plurality of sort address spaces including one sort thread for receiving records within one group to be sorted, each of the sort threads being implemented by a SORT-ROUTINE; and the main address space including a plurality of load threads, a recovery thread, a termination thread, and a main thread, each of the load threads being implemented in a LOAD-ROUTINE, the recovery thread being implemented by a RECOVERY-EXIT ROUTINE, the termination thread being implemented by a TERMINATION EXIT-ROUTINE; and the main thread being implemented by a MAIN-ROUTINE, each of the load threads for receiving records from a corresponding sort thread, the main thread for controlling the plurality of sort threads and the plurality of load threads; and (b) utilizing the main thread, the plurality of sort threads and the plurality of load threads for sorting the plurality of groups of records in parallel, wherein the recovery thread executes when an error occurs in the MVS/ESA operating system; and wherein the termination thread executes when at least one of the plurality of sort threads executes prematurely.

25. The method of claim 24 in which the main thread starts and passes records to the plurality of sort threads and starts the plurality of load threads and waits for the sort threads and plurality of load threads to terminate.

* * * * *